(12) United States Patent
Seeker et al.

(10) Patent No.: US 8,008,808 B2
(45) Date of Patent: Aug. 30, 2011

(54) METHOD AND APPARATUS FOR CONTROLLING A HYBRID POWER SYSTEM

(75) Inventors: Steven Seeker, Waukesha, WI (US); Kevin Dennis, Waukesha, WI (US); Mike Hughes, Menomonee Falls, WI (US)

(73) Assignee: ZBB Energy Corporation, Menomonee Falls, WI (US)

( * ) Notice: Subject to any disclaimer, the term of this patent is extended or adjusted under 35 U.S.C. 154(b) by 346 days.

(21) Appl. No.: 12/355,169

(22) Filed: Jan. 16, 2009

(65) Prior Publication Data

US 2010/0181837 A1 Jul. 22, 2010

(51) Int. Cl.
*H02J 1/00* (2006.01)
(52) U.S. Cl. .......................................... 307/72
(58) Field of Classification Search .................... 307/64, 307/72
See application file for complete search history.

(56) References Cited

U.S. PATENT DOCUMENTS

| | | | |
|---|---|---|---|
| 5,369,353 A | 11/1994 | Erdman | |
| 6,362,540 B1 * | 3/2002 | Hill | 307/52 |
| 6,674,263 B2 | 1/2004 | Agbossou et al. | |
| 7,000,395 B2 | 2/2006 | Wai et al. | |
| 7,393,604 B2 | 7/2008 | Rocke et al. | |
| 7,411,308 B2 * | 8/2008 | Parmley | 290/1 R |
| 7,432,691 B2 | 10/2008 | Cutler | |
| 7,436,079 B2 | 10/2008 | Meyers et al. | |
| 2005/0200133 A1 | 9/2005 | Wobben | |
| 2008/0129120 A1 | 6/2008 | Su et al. | |
| 2008/0143304 A1 | 6/2008 | Bose et al. | |
| 2009/0140577 A1 * | 6/2009 | Fishman | 307/82 |

FOREIGN PATENT DOCUMENTS

JP 2006-129585 * 5/2006

OTHER PUBLICATIONS

International Search Report dated Jul. 9, 2010 for PCT/US2009/066574.

* cited by examiner

*Primary Examiner* — Michael Rutland Wallis
(74) *Attorney, Agent, or Firm* — Boyle Fredrickson, S.C.

(57) ABSTRACT

The present invention provides a simplified method of controlling power among the various sources and loads in a power system. Power generating sources are each connected to a common DC bus through a converter designed to optimize power flow to the DC bus. A DC storage device is connected to the common DC bus through a power regulator designed to maintain a constant voltage on the DC bus. Further, an inverter may be provided to convert the DC voltage to an AC voltage for a customer load or for connection to the utility grid. Each power conversion device is independently controlled to provide a modular and simplified power control system.

16 Claims, 6 Drawing Sheets

METHOD AND APPARATUS FOR CONTROLLING A HYBRID POWER SYSTEM

BACKGROUND OF THE INVENTION

1. Field of the Invention

The invention relates to a method and apparatus of controlling a hybrid power system. Specifically, this invention manages energy and power flow among one or more power generating sources, storage devices, loads, and the utility grid or an off grid power system, each of which is coupled to a common DC bus.

2. Discussion of the Related Art

In recent years, increased demands for energy and increased concerns about supplies of fossil fuels and their corresponding pollution have led to an increased interest in renewable energy sources. Two of the most common and best developed renewable energy sources are photovoltaic energy and wind energy. Other renewable energy sources may include fuel cells, hydroelectric energy, tidal energy, and bio-fuel or biomass generators. However, using renewable energy sources to generate electrical energy presents a new set of challenges.

One of the biggest challenges for connecting renewable energy sources to existing AC grids, whether the utility grid or an off-grid system, is that renewable energy sources provide a variable supply of energy. The supply may vary, for example, according to the amount of wind, cloud cover, or time of day. Further, different energy sources provide different types of electrical energy. A wind turbine, for example, is better suited to provide Alternating Current (AC) energy while a photovoltaic cell is better suited to provide Direct Current (DC) energy. As a result, combining multiple sources of renewable energy with other generating systems, such as the utility grid or independent micro turbines and generators, into a single system with an AC output requires integrating each of these different energy sources. Due to the variable nature of the energy supplied by renewable sources, it may be desirable to integrate a storage device in the power system. The energy storage device may be charged during periods of peak production by the renewable source or, alternately, by the utility grid or other generating source. The energy storage device may then supply energy back to the grid when the renewable source is generating less energy than is required by the loads in a grid-independent system or less than is commanded by the utility in a grid-tied system.

Prior attempts to integrate multiple sources of renewable energy typically require individually connecting each energy source as well as the storage device to a grid, where the grid may be either a stand-alone grid or the utility grid. Each manufacturer of a generating source, for example the wind turbine or the photovoltaic array, or load provides a power converter to connect the source or load to the grid. This approach typically results in an undesirable double power conversion, first converting the generating source to an AC voltage compatible with the utility grid and then back to a DC voltage compatible with the storage device.

Other attempts to integrate multiple sources have utilized a high-level controller managing energy flow by each of the devices. For example, multiple AC sources operating in parallel in a grid-independent system typically require transfer switches and a control scheme to select desired generating sources. Such integration systems typically require complex software customized for each system. Addition of other generating sources or loads to the system requires subsequent modification of the integration software and connection hardware. Consequently, this complex control scheme limits the flexibility of integrating future generating sources or other modifications into a power system.

SUMMARY AND OBJECTS OF THE INVENTION

Consistent with the foregoing and in accordance with the invention as embodied and broadly described herein, a method and apparatus for controlling a hybrid power system is described in suitable detail to enable one of ordinary skill in the art to make and use the invention.

The present invention provides a simplified method of controlling power among the various sources and loads in a power system. A power conversion device is provided between each generating source and a common DC bus. Each power conversion device converts any electrical energy generated by the generating source according to a control algorithm optimized for the particular generating source independent of other sources or loads. For example, Maximum Power Point (MPP) tracking, as is known in the art, may be used on a converter connected to a photovoltaic array to provide maximum power or energy transfer from the generating source to the common DC bus. A DC storage device and a power regulator, connecting the DC storage device to the common DC bus, are also provided. When power in excess of that required by the loads connected to the system is being generated, the DC storage device charges until it reaches maximum capacity. If the power demand by the loads exceeds the power being generated in the system, the DC storage device discharges to meet the extra demand. The power regulator monitors the voltage level on the DC bus as an indicator to determine whether the supply exceeds the demand or whether the demand exceeds the supply. In addition, if the power system includes a grid-independent AC load or is connected to the utility grid, an inverter is provided between the common DC bus and the AC system. The inverter controller is capable of providing bidirectional power flow such that excess energy generated by the sources may be supplied to the utility grid when the power generated exceeds the power demanded. Similarly, energy may be drawn from the utility grid when the power generated by the sources fails to meet the power demanded by the power system Specifically then, the present invention is a controller for a hybrid power system including at least one energy converter. Each energy converter is electrically coupled to an electrical energy generating device. The apparatus includes at least one DC energy storage device. An energy regulator is electrically coupled to the DC energy storage devices. A DC bus is then electrically coupled to each of the energy converters and the energy regulator. The energy regulator includes a first voltage signal indicating the value of a DC voltage present on the DC bus and a first control unit which maintains the DC voltage at a substantially constant value.

Thus it is a first object of the invention to provide an apparatus for regulating power flow in a hybrid power system with a simplified control system utilizing a common DC bus. The control system allows each converter to operate at a desirable operating point for the particular type of generating device coupled to the converter and generally independent of the other converters.

The power controller may further include a second voltage signal indicating the value of the DC voltage present on the DC bus and a second control unit configured to disable power flow from the electrical energy generating devices when the DC voltage reaches a predetermined maximum value.

Thus it is another object of the invention that each of the converters may operate to prevent further power flow into the system if the regulator is unable to maintain the constant DC voltage below a maximum value.

The power controller may further include an inverter electrically coupled to the DC bus to convert the DC voltage to an AC voltage. The AC voltage may either supply power to an AC load independent of a utility grid or the AC voltage may be connected to the utility grid such that the inverter supplies power to the grid, to an AC load, or to a combination of the grid and the AC load.

Thus it is another object of the invention that the power generated by the system may drive AC loads and may alternately be fed back onto the utility grid.

The inverter may also selectively provide bidirectional power flow between the DC bus and the utility grid.

Thus it is another object of the invention that the DC storage device may be charged from the utility grid if the other electrical generating sources provide insufficient power for charging the device.

In addition, a DC load may be coupled to the common DC bus, either directly or using a DC to DC converter if a voltage other than the DC bus voltage is desired, such that the power system may supply power to either a DC or an AC load.

It is another aspect of the power controller that at least one additional energy converter coupled to an additional electrical energy generating device may be coupled to the common DC bus without modifying any of the existing energy converters or the energy regulator.

Thus it is yet another aspect of the invention that the converters are modular. The independent nature of the converters allows converters to be added or removed without requiring modifications to the control units of other converters or the regulator.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Preferred exemplary embodiments of the invention are illustrated in the accompanying drawings in which like reference numerals represent like parts throughout, and in which.

Figure 1:
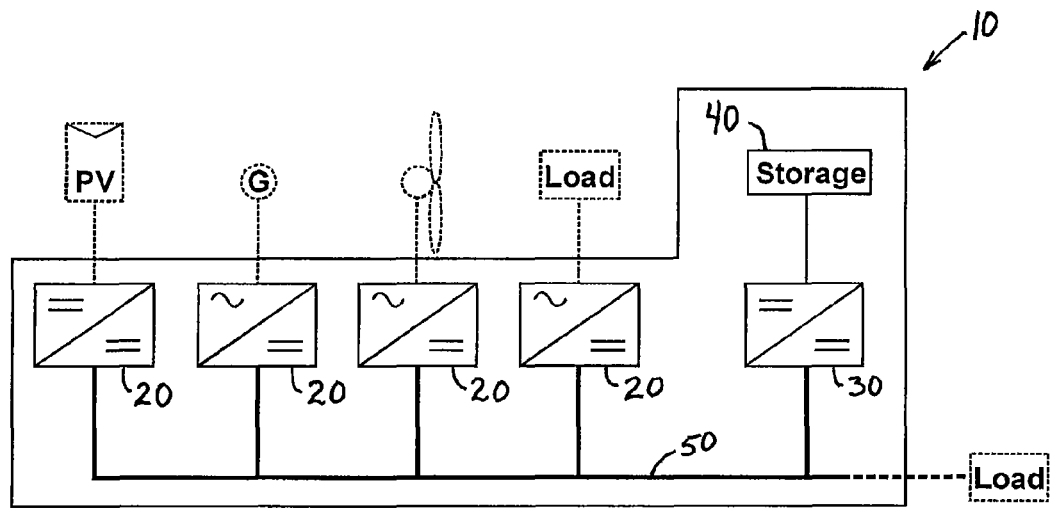
FIG. 1 is a schematic representation of a first embodiment of the present invention illustrating exemplary generating sources and loads.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The present invention provides a method and apparatus of controlling a hybrid power system 10. Specifically, this invention manages power flow among one or more power generating sources, storage devices, loads, and the utility grid, each of which is coupled to a common DC bus 50, either directly or by a power conversion device.

Figure 4:
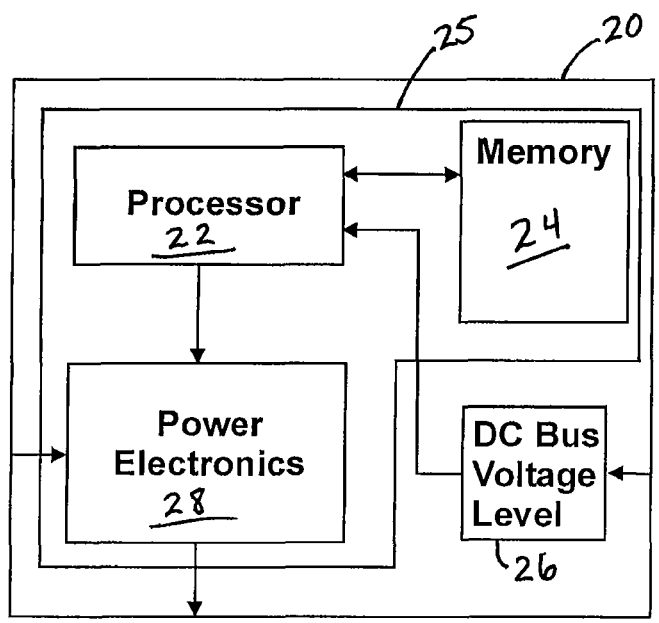
FIG. 4 is a schematic representation of an exemplary converter.
Figure 5:
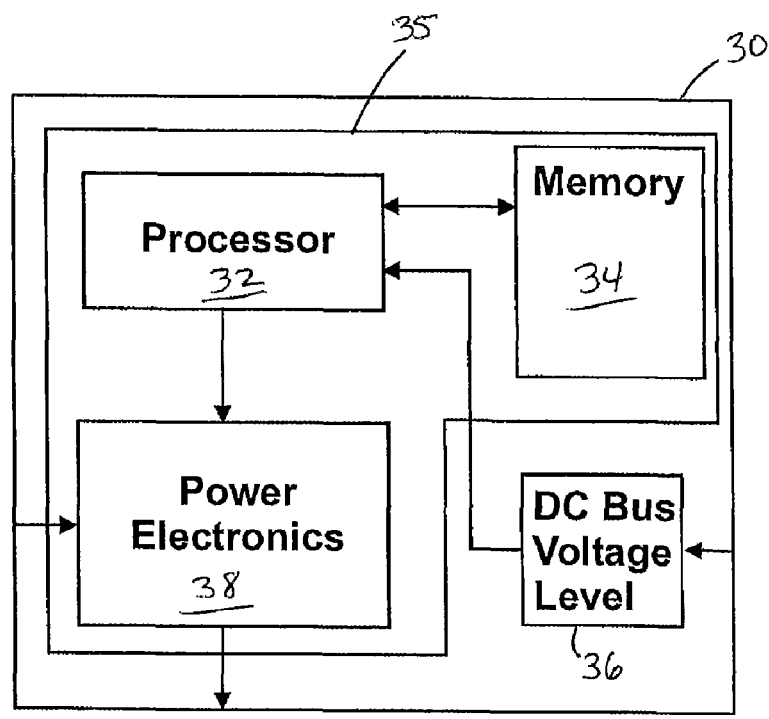
FIG. 5 is a schematic representation of an exemplary regulator.
Figure 6:
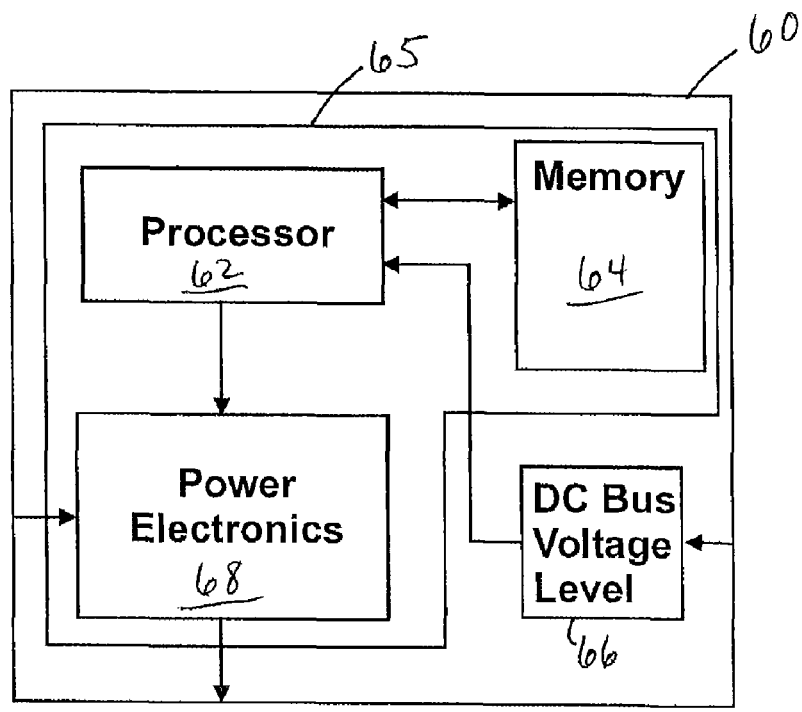
FIG. 6 is a schematic representation of an exemplary inverter.

Throughout this description, several terms will be used for describing the power conversion devices used to couple a generating source or load to the common DC bus 50, including: a converter 20, a regulator 30, and an inverter 60. Referring to FIGS. 4-6, each of the converter 20, regulator 30, and inverter 60 include both a voltage signal 26, 36, 66 and a control unit 25, 35, 65. The voltage signal 26, 36, 66 indicates the voltage level present on the DC bus 50 and may be generated by individual voltage sensors within each power conversion device, a single voltage sensor providing the signal to multiple power conversion devices, or a combination of voltage sensors providing a signal to individual power conversion devices and to multiple power conversion devices. The control unit 25, 35, 65 of each power conversion device preferably includes a power conversion section, consisting of power electronic devices 28, 38, 68, a processor 22, 32, 62 capable of executing a program to send control signals to the power electronic devices 28, 38, 68, and memory 24, 34, 64 for storing the program capable of executing on the processor 22, 32, 62. The voltage signal 26, 36, 66 is read by the program executing on the processor 22, 32, 62. The program outputs control signals to the power electronic devices 28, 38, 68 to regulate power flow through the device as described in more detail below. Alternately, the control unit 25, 35, 65 may be made up solely of the power electronic devices 28, 38, 68 and control hardware connected directly to the voltage signal 26, 36, 66 to regulate power flow through the device. For example, a boost converter, as is known in the art, may be used to convert a first DC voltage level to a higher, second DC voltage level.

Referring to FIG. 1, a first embodiment of the hybrid power system 10 is illustrated. The power system 10 includes at least one converter 20, each converter 20 is connected to a generating source. The power system 10 further includes at least one regulator 30, each regulator 30 connected to at least one storage device 40. A common DC bus 50 links each of the converters 20 and the regulators 30 together.

Each converter 20 is electrically coupled between a generating source and the common DC bus 50. The generating source may be of any type known in the art, including but not limited to wind, photovoltaic, hydroelectric, tidal, biofuel or biomass generating sources. Each of these sources outputs either an AC or a DC voltage with an amplitude suited to the type of generating source. The generating source provides an input voltage to the power electronics 28 of the converter 20. The power electronics 28 are configured to convert this input voltage to a desired DC voltage level as an output voltage to the DC bus 50. For example, the desired DC voltage level may be 650 volts if the power system connects to a 460 volt utility grid. Alternately, the DC voltage level may be any desired DC voltage, such as 48 volts, that may be required by a specific DC load. The DC voltage level may similarly be selected to provide optimum energy conversion between a generating source and the DC bus 50.

Each regulator 30 is electrically coupled between a storage device 40 and the common DC bus 50. The storage device 40 may, for example, include a battery, a fuel cell, or a regenerative fuel cell. It is contemplated that each storage device 40 may be made of either a single device or multiple devices connected in series, parallel, or a combination thereof as is known in the art. The power electronics 38 of each regulator 30 are configured to allow bidirectional power flow between the DC bus 50 and the storage device 40. The DC bus 50 operates at a first DC voltage level and the storage device 40 operates at a second DC voltage level. Alternately, the DC bus 50 and the storage device 40 may operate at the same DC voltage level.

Figure 2:
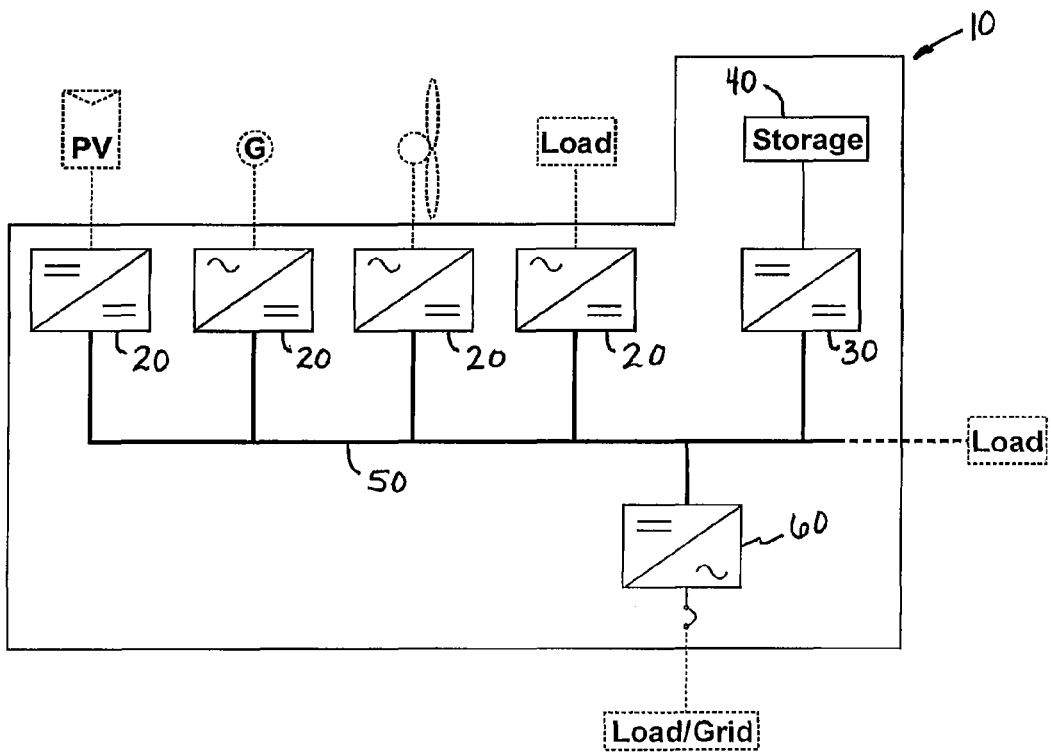
FIG. 2 is a schematic representation of another embodiment of the present invention illustrating exemplary generating sources and loads and further illustrating a connection to an AC customer load or utility grid.
Figure 3:
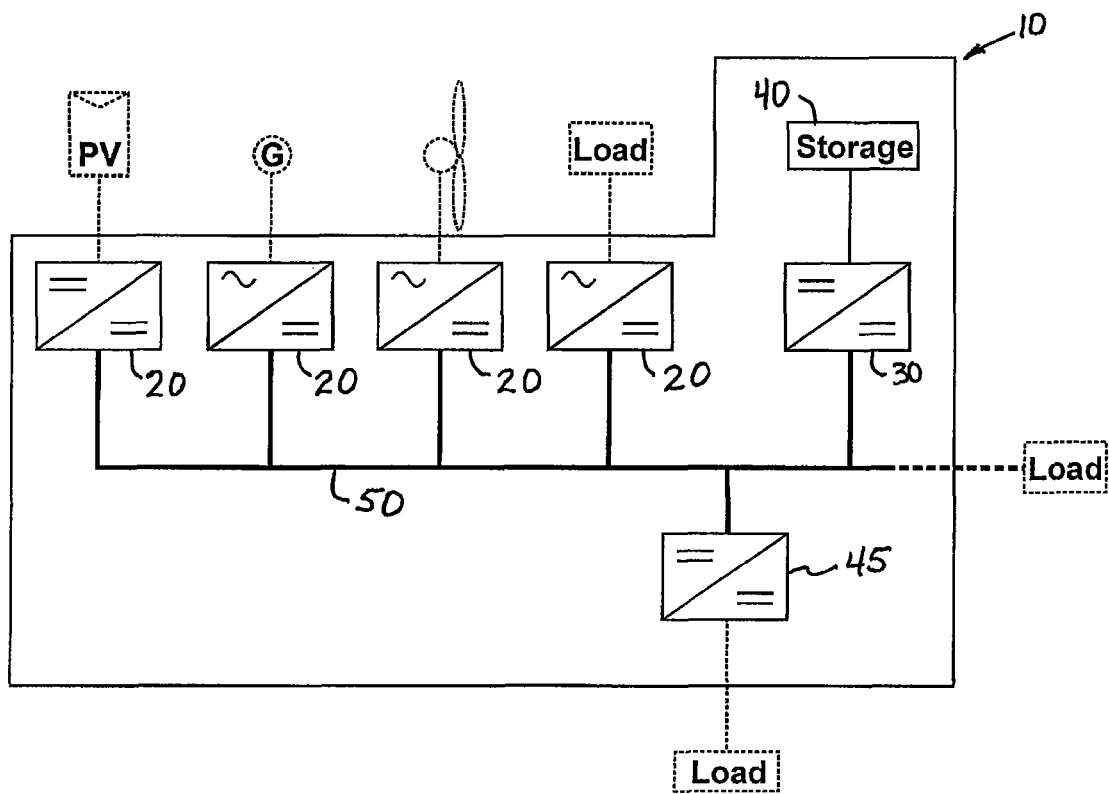
FIG. 3 is a schematic representation of another embodiment of the present invention illustrating exemplary generating sources and loads and further illustrating a connection to an DC customer load at a different DC voltage than the DC bus.

Referring next to FIGS. 2 and 3, the hybrid power system 10 may further include an output power conversion device, for example an inverter 60 or another DC-to-DC converter 45. The inverter 60 is electrically coupled between the DC bus 50 and an AC load. The AC load may be either independent of or connected to the utility grid. The power electronics 68 of each inverter 60 may be configured to allow bidirectional power flow between the DC bus 50 and the AC load. The bidirectional power flow allows the utility grid, when connected, to supply power to the DC bus 50, supplementing the power provided by the generating sources if the demand from the loads connected to the power system exceed the power supplied by the generating sources. The DC-to-DC converter 45 is electrically coupled between the DC bus 50 and a DC load operating at a different voltage level than the voltage on the DC bus 50. It is contemplated that any number and combination of loads may be connected to the system, such that a load may be connected to the DC bus 50 either directly, through the inverter 60, through the DC-to-DC converter, or any combination or multiple thereof.

Figure 7:
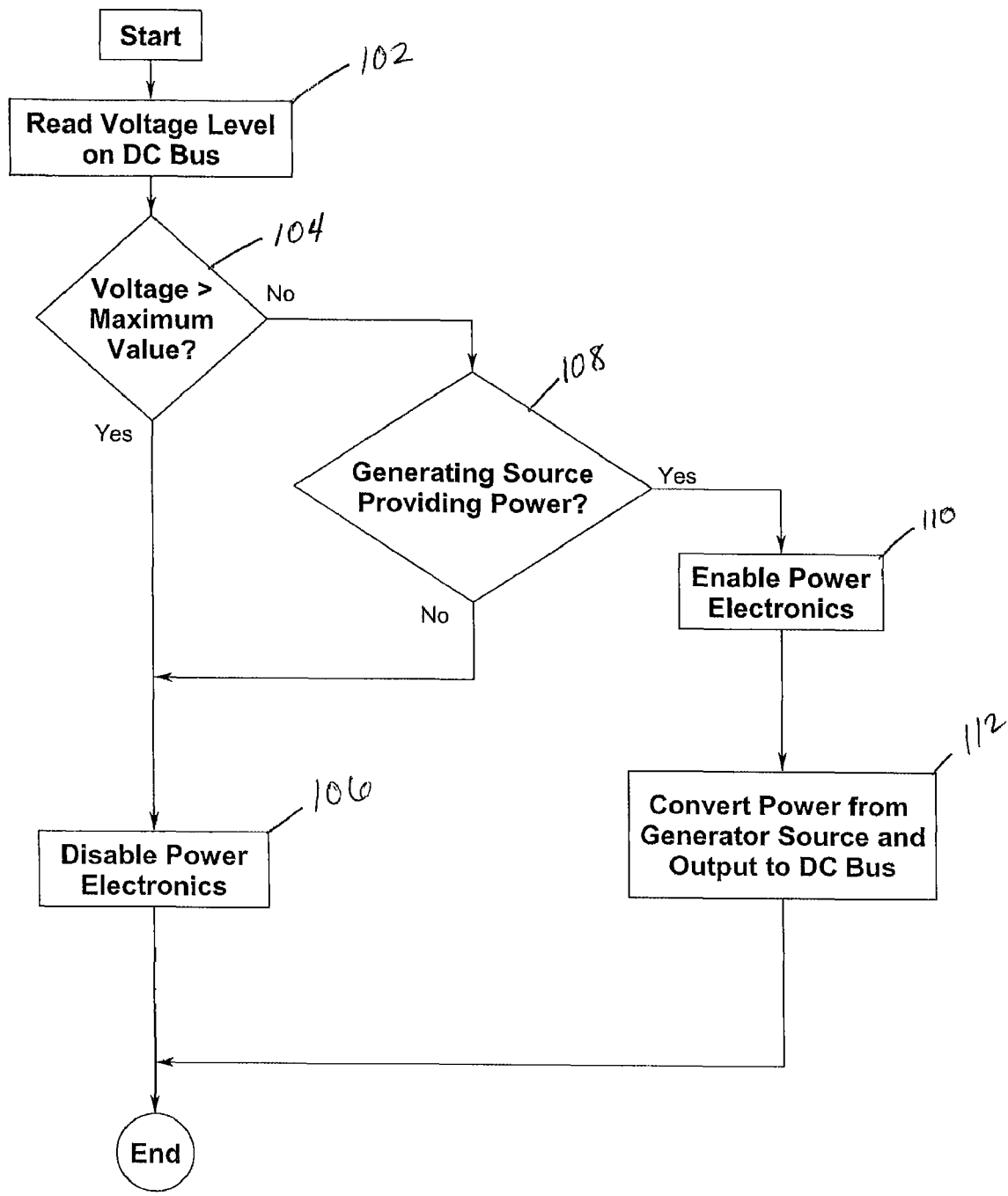
FIG. 7 is a flowchart of the operation of a converter.

In operation, each converter 20 operates independently of the other converters 20 and regulators 30 to supply power to the DC bus 50 according to the steps illustrated in FIG. 7. In step 102, the converter 20 monitors the voltage signal 26 to determine what DC voltage is present on the DC bus 50. In step 104, the voltage signal 26 is compared against a predetermined maximum value, for example 120% of the desired DC bus voltage level. If the voltage on the DC bus 50 rises above this maximum value, the converter 20 will disable the power electronics 28, according to step 106, in order to prevent further power from being input to the system. If the voltage on the DC bus 50 is below the maximum value, the converter 20 is ready to convert energy as provided by the generating source. In step 108, the converter 20 monitors the generating source to determine whether it is generating power. If no power is being generated, the power electronics 28, will be disabled, according to step 106, because there is no need to transfer power to the DC bus 50. If power is being generated, the power electronics 28 are enabled to convert the input voltage to the desired DC Bus voltage, according to steps 110 and 112. The steps of FIG. 7 are repeated such that the converter 20 is continuously monitoring the voltage on the DC bus 50 and responding appropriately.

By operating each converter 20 independently of the other converters 20 and regulators 30, maximum operating efficiency may be achieved. First, by converting the energy generated by each source onto a common DC bus 50, the power system 10 eliminates the double-conversion process commonly required to convert the generated energy into an AC voltage for connection to the grid. In addition, the voltage level on the DC bus 50 is regulated to a constant value, as described below. This allows the converters 20 to be configured to operate at maximum efficiency. For example, a maximum power point tracking algorithm, as is known in the art, may be executed by the processor 22 in the control unit 25 to provide maximum power transfer to the DC bus 50.

Figure 8:
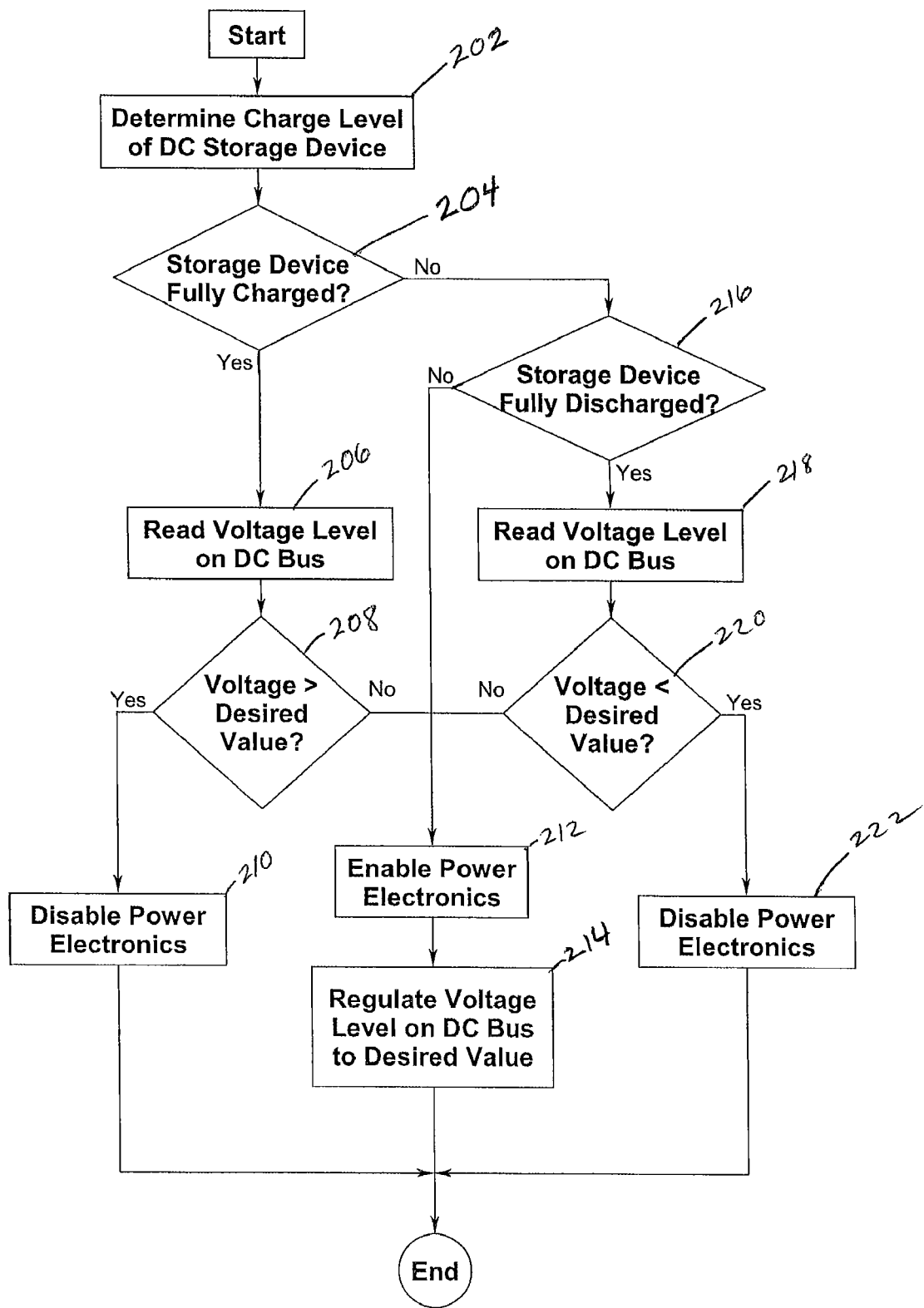
FIG. 8 is a flowchart of the operation of a regulator.

The regulator 30 operates independently of each of the converters 20 to regulate the voltage level on the DC Bus 50 according to the steps illustrated in FIG. 8. In step 202, the regulator 30 monitors the level of charge in the storage device 40. At step 204, the regulator 30 determines whether the storage device 40 is fully charged. If the storage device 40 is fully charged, it is unable to accept further energy from the DC bus 50. If the voltage level on the DC bus 50 exceeds the desired voltage level while the storage device 40 is fully charged, the power electronics 38 are disabled to prevent additional power flow either to or from the storage device 40, as illustrated in steps 206, 208 and 210. However, if the voltage level on the DC bus 50 begins to drop below the desired voltage level and the storage device 40 is fully charged, the power electronics 38 are enabled to transmit energy from the storage device 40 to the DC bus 50 to maintain a constant voltage on the DC bus 50, as shown in steps 212 and 214.

At step 216, the regulator 30, after determining that the storage device 40 is not fully charged, determines whether the storage device 40 is fully discharged. If the voltage level on the DC bus 50 drops below the desired voltage level while the storage device 40 is fully discharged, the power electronics 38 are disabled because the storage device is unable to supply energy to the DC bus 50, as illustrated in steps 218, 220 and 222. However, if the voltage level on the DC bus 50 begins to rise above the desired voltage level and the storage device 40 is fully discharged, the power electronics 38 are enabled to transmit energy from the DC bus 50 to charge the storage device 40 and to maintain a constant voltage on the DC bus 50, as shown in steps 212 and 214.

If the regulator 30 determines that the storage device is partially charged, the power electronics 38 are enabled and the regulator operates to maintain a constant voltage level on the DC bus 50, as shown in steps 212 and 214. The constant voltage level is maintained by charging the storage device 40 if the voltage level on the DC bus 50 begins to rise and by discharging the storage device 40 if the voltage level on the DC bus 50 begins to drop. The steps of FIG. 8 are repeated such that the regulator 20 is continuously monitoring the voltage on the DC bus 50 and responding appropriately. In this manner, the regulator 30 and storage device 40 operate to maintain a constant voltage on the DC bus 50. The storage device 40 is preferably sized such that it generally remains in a partially charged state, receiving energy from the DC bus 50 when the generated power exceeds the demands from the loads and supplying energy to the DC bus 50 when the loads demand more energy than is provided by the generating sources.

The inverter 60 similarly operates independently of the other power conversion devices. When the power system 10 is connected to a grid-independent AC load, the inverter 60 reacts to the power requested from the load and supplies the appropriate power to the AC output of the inverter 60. When the power system 10 is connected to the utility grid, the inverter 60 maintains a constant voltage and frequency on the AC side of the inverter 60. By maintaining a constant voltage and frequency at the AC side of the inverter 60 when connected to the utility grid, changes in the voltage level on the DC bus 50 will result in power transfer either to or from the utility grid as required. This grid connection can help maintain the DC bus 50 at the desired DC voltage level and can further provide another source of energy to charge the storage device 40.

Figure 9:
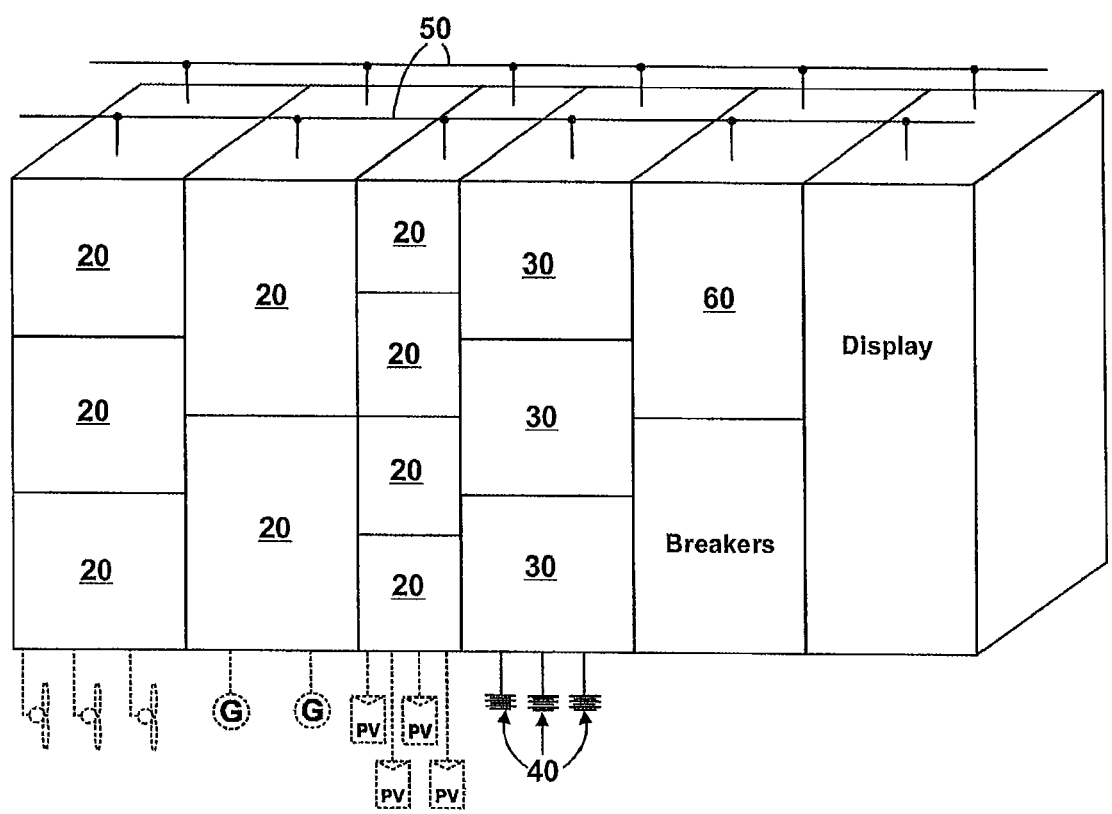
FIG. 9 is a schematic representation illustrating a modular rack implementation of the present invention.

The independent operation of each of the converters 20 and regulators 30 facilitates a modular construction of the power system 10. For example, each of the converters 20 and regulators 30 may be constructed as an individual module, as illustrated in FIG. 9. Each module may be of varying size depending on, for example, the power conversion capacity of the module and the power electronics requirements for the type of generating source. Preferably, each module is configured to be mounted to a common rack in any arrangement, but preferably in a series of columns. The DC bus 50, extends in a generally horizontal plane above the modules with parallel branches extending in generally vertical planes down each column of modules. The converters 20 and regulators 30 are configured to connect to the DC bus 50 along one of the vertical branches. Similarly, the inverter 60 is another module configured to be mounted on the common rack and connect to a vertical branch of the DC bus 50. Other modules may be included as necessary (e.g., AC breakers between the inverter and the utility grid or a display panel) to similarly mount to the common rack and may or may not connect to DC bus 50 as needed.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A power controller for a hybrid power system comprising:
   a common DC bus;
   at least one energy converter having an input electrically coupled to an electrical energy generating device and an output electrically coupled to the common DC bus, each energy converter further comprising:
   an input configured to receive a voltage signal corresponding to an amplitude of a DC voltage present on the DC bus, and
   a control unit configured to convert energy independently of the other converters and to disable power flow from the electrical energy generating device when the amplitude of the DC voltage exceeds a predetermined maximum value;
   at least one DC energy storage device;
   an energy regulator having a first terminal electrically coupled to the DC energy storage device and a second terminal electrically coupled to the DC bus,
   wherein the energy regulator further comprises:
   an input configured to receive a voltage signal corresponding to the amplitude of the DC voltage present on the DC bus, and
   a control unit configured to convert energy independently of the converters and to maintain the amplitude of the DC voltage at a substantially constant value.

2. The power controller of claim 1 wherein the at least one DC energy storage device is a regenerative fuel cell.

3. The power controller of claim 1 further comprising an inverter electrically coupled to the DC bus to convert the DC voltage to an AC voltage.

4. The power controller of claim 3 wherein the inverter supplies power to an AC load independent of a utility grid.

5. The power controller of claim 3 wherein the inverter is connected to the utility grid and supplies power to one of the grid, an AC load, or a combination thereof.

6. The power controller of claim 5 wherein the inverter provides bidirectional power flow.

7. The power controller of claim 1 wherein the electrical energy generating device is one of a wind, photovoltaic, hydroelectric, biofuel, tidal, or biomass generating source.

8. The power controller of claim 1 wherein a DC load is coupled to the DC bus.

9. The power controller of claim 1 wherein the control unit of the regulator further comprises:
   a processor configured to provide a plurality of control signals as a function of the amplitude of the DC voltage;
   a memory device to store a program capable of execution on the processor;
   a power conversion section receiving the control signals from the processor to transfer energy either from the storage device to the DC bus or from the DC bus to the storage device to maintain the amplitude of the DC voltage on the DC bus at a substantially constant value.

10. The power controller of claim 1 wherein the control unit of the converter further comprises:
    a processor configured to provide a plurality of control signals;
    a memory device to store a program capable of execution on the processor;
    a power conversion section receiving the control signals from the processor to convert electrical energy from the generating device to the DC voltage on the DC bus.

11. The power controller of claim 1 wherein at least one of an additional energy converter coupled to an additional electrical energy generator may be coupled to the DC bus without modifying any of the existing energy converters or the energy regulator.

12. A power controller for a hybrid power system comprising:
    a common DC bus;
    at least one energy converter electrically coupled between an electrical energy generating device and the common DC bus wherein the energy converter further comprises:
    a first voltage signal indicating a DC voltage level present on the DC bus, and
    a first control unit executing independently of other control units to regulate power flow from the energy generating device to the DC bus while the DC voltage level is below a predetermined maximum value and to disable power flow from the energy generating device when the DC voltage level is above a predetermined maximum value;
    at least one DC energy storage device; and
    at least one energy regulator electrically coupled between each DC energy storage device and the common DC bus wherein each energy regulator further comprises:

a second voltage signal indicating the DC voltage level present on the DC bus, and a second control unit executing independently of other control units to maintain the DC voltage level at a substantially constant value.

13. The power controller of claim 12 further comprising an inverter electrically coupled between the DC bus and an AC grid to convert the DC voltage to an AC voltage wherein the inverter includes a third voltage signal indicating the DC voltage level present on the DC bus and a third control unit selectively provides bidirectional power flow between the DC bus and the AC grid.

14. The power controller of claim 13 wherein a single voltage sensor provides each of the first, second and third voltage signals.

15. A method of regulating power flow between a plurality of components connected by a common DC bus in a hybrid power system comprising the steps of:

providing at least one energy converter, each energy converter having a first DC voltage signal and a first control unit configured to couple an electrical energy generating source to the DC bus independently of the other energy converters;

monitoring a DC voltage present on the DC bus with the first DC voltage signal;

converting electrical energy generated by each generating source to a DC voltage and a DC current suitable for connection to the DC bus with the corresponding energy converter when the monitored DC voltage is less than a predetermined maximum value;

providing an energy regulator having a second DC voltage signal and a second control unit configured to couple a DC electrical energy storage device to the DC bus;

monitoring the DC voltage present on the DC bus with the second voltage signal; and regulating the DC voltage to a substantially constant value with the second control unit independently of the operation of the energy converters.

16. The method of claim 15 further comprising the steps of:

providing an inverter, the inverter having a third DC voltage signal and a third control unit configured to couple the DC bus to an AC voltage grid;

monitoring the DC voltage present on the DC bus with the third DC voltage signal; and converting voltage from either DC to AC or AC to DC with the inverter.

* * * * *